US010332198B2

(12) United States Patent
Grove et al.

(10) Patent No.: US 10,332,198 B2
(45) Date of Patent: *Jun. 25, 2019

(54) METHOD AND SYSTEM TO GENERATE A LISTING IN A NETWORK-BASED COMMERCE SYSTEM

(71) Applicant: eBay Inc., San Jose, CA (US)

(72) Inventors: Steve Grove, San Jose, CA (US); Larry Cornett, Los Gatos, CA (US)

(73) Assignee: eBay Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/643,874

(22) Filed: Jul. 7, 2017

(65) Prior Publication Data

US 2018/0033080 A1 Feb. 1, 2018
US 2019/0139131 A9 May 9, 2019

Related U.S. Application Data

(63) Continuation of application No. 14/318,525, filed on Jun. 27, 2014, now Pat. No. 9,704,194, which is a
(Continued)

(51) Int. Cl.
*G06Q 30/06* (2012.01)
*G06Q 30/08* (2012.01)
(52) U.S. Cl.
CPC ............. *G06Q 30/08* (2013.01); *G06Q 30/06* (2013.01)
(58) Field of Classification Search
CPC ... G06F 17/30386; G06Q 30/06; G06Q 30/08
See application file for complete search history.

(56) References Cited

U.S. PATENT DOCUMENTS 5,537,586 A 7/1996 Amram et al.
5,740,425 A 4/1998 Povilus
(Continued)

FOREIGN PATENT DOCUMENTS

EP 1841195 A1 10/2007
WO WO-2007061975 A2 5/2007
WO WO-2007061975 A3 5/2007

OTHER PUBLICATIONS

U.S. Appl. No. 10/648,125, filed Aug. 25, 2003, Method and System to Generate a Listing in a Network-Based Commerce System, U.S. Pat. No. 8,819,039.
(Continued)

*Primary Examiner* — Cam Y T Truong
(74) *Attorney, Agent, or Firm* — Schwegman Lundberg & Woessner, P.A.

(57) ABSTRACT

A method and system of generating a listing in a network-based commerce system is provided. The method includes receiving listing identification data from a user, and retrieving listing data associated with the listing based on the listing identification data. Thereafter, a listing is generated that is at least partially based on the listing data and posted on the network-based commerce system. In one embodiment, the user may edit the listing data prior to posting the listing. The network-based commerce system may include, as a source of attributes, a database of listing data associated with at least one of movies, music, games, books and motor vehicles. In one embodiment, a plurality of check boxes is provided each of which is associated with an attribute of the listing and the method automatically, without human intervention, checks attributes based on the listing data.

13 Claims, 20 Drawing Sheets

Related U.S. Application Data continuation of application No. 10/648,125, filed on Aug. 25, 2003, now Pat. No. 8,819,039.

(60) Provisional application No. 60/437,199, filed on Dec. 31, 2002.

(56) References Cited

U.S. PATENT DOCUMENTS

| | | | |
|---|---|---|---|
| 5,822,123 | A | 10/1998 | Davis et al. |
| 5,844,554 | A * | 12/1998 | Geller ............... G06F 8/34 715/744 |
| 5,950,173 | A | 9/1999 | Perkowski |
| 6,029,141 | A | 2/2000 | Bezos et al. |
| 6,044,363 | A | 3/2000 | Mori et al. |
| 6,119,101 | A | 9/2000 | Peckover |
| 6,122,648 | A | 9/2000 | Roderick |
| 6,144,958 | A | 11/2000 | Ortega et al. |
| 6,151,601 | A | 11/2000 | Papierniak et al. |
| 6,216,264 | B1 | 4/2001 | Maze et al. |
| 6,230,156 | B1 | 5/2001 | Hussey |
| 6,266,649 | B1 | 7/2001 | Linden et al. |
| 6,401,084 | B1 | 6/2002 | Ortega et al. |
| 6,410,084 | B1 | 6/2002 | Klare et al. |
| 6,598,026 | B1 | 7/2003 | Ojha et al. |
| 6,631,522 | B1 * | 10/2003 | Erdelyi ............ G06F 17/30793 348/E7.061 |
| 6,641,037 | B2 | 11/2003 | Williams |
| 6,697,800 | B1 | 2/2004 | Jannink et al. |
| 6,697,823 | B2 | 2/2004 | Otsuka et al. |
| 6,697,824 | B1 | 2/2004 | Bowman-Amuah |
| 6,853,982 | B2 | 2/2005 | Smith et al. |
| 6,904,410 | B1 * | 6/2005 | Weiss ............... G06Q 10/087 705/26.61 |
| 6,928,425 | B2 | 8/2005 | Grefenstette et al. |
| 7,228,298 | B1 | 6/2007 | Raines |
| 7,295,995 | B1 | 11/2007 | York et al. |
| 7,366,721 | B1 | 4/2008 | Bennett et al. |
| 7,886,156 | B2 | 2/2011 | Franchi |
| 8,086,502 | B2 | 12/2011 | Krishnamurthy et al. |
| 8,194,985 | B2 | 6/2012 | Grigsby et al. |
| 8,260,656 | B1 * | 9/2012 | Harbick ............. G06Q 30/02 705/26.7 |
| 8,301,512 | B2 | 10/2012 | Hamilton et al. |
| 8,306,872 | B2 | 11/2012 | Inoue et al. |
| 8,402,068 | B2 | 3/2013 | Clendinning et al. |
| 8,489,438 | B1 | 7/2013 | Ibrahim |
| 8,768,937 | B2 | 7/2014 | Clendinning et al. |
| 8,819,039 | B2 | 8/2014 | Grove et al. |
| 8,849,693 | B1 | 9/2014 | Koyfman et al. |
| 9,076,173 | B2 | 7/2015 | Hamilton et al. |
| 9,171,056 | B2 | 10/2015 | Clendinning et al. |
| 9,412,128 | B2 | 8/2016 | Clendinning et al. |
| 9,704,194 | B2 | 7/2017 | Grove et al. |
| 2002/0026353 | A1 | 2/2002 | Porat et al. |
| 2002/0052801 | A1 | 5/2002 | Norton et al. |
| 2002/0082893 | A1 | 6/2002 | Barts et al. |
| 2002/0082953 | A1 | 6/2002 | Batham et al. |
| 2002/0083448 | A1 | 6/2002 | Johnson |
| 2002/0154157 | A1 | 10/2002 | Sherr et al. |
| 2003/0033216 | A1 | 2/2003 | Benshemesh |
| 2003/0036964 | A1 * | 2/2003 | Boyden ............. G06Q 30/0609 705/26.3 |
| 2003/0061147 | A1 | 3/2003 | Fluhr et al. |
| 2003/0083961 | A1 | 5/2003 | Bezos et al. |
| 2003/0105682 | A1 | 6/2003 | Dicker et al. |
| 2003/0110100 | A1 | 6/2003 | Wirth, Jr. |
| 2003/0204449 | A1 * | 10/2003 | Kotas ............... G06Q 10/087 707/781 |
| 2003/0216971 | A1 | 11/2003 | Sick et al. |
| 2004/0128320 | A1 | 7/2004 | Grove et al. |
| 2004/0210479 | A1 | 10/2004 | Perkowski et al. |
| 2004/0243485 | A1 | 12/2004 | Borenstein et al. |
| 2005/0251409 | A1 | 11/2005 | Johnson et al. |
| 2006/0031216 | A1 | 2/2006 | Semple et al. |
| 2006/0085477 | A1 | 4/2006 | Phillips et al. |
| 2006/0106683 | A1 | 5/2006 | Fisher et al. |
| 2006/0143158 | A1 | 6/2006 | Ruhl et al. |
| 2006/0190352 | A1 | 8/2006 | Zeidman |
| 2007/0112968 | A1 | 5/2007 | Schwab |
| 2007/0118441 | A1 | 5/2007 | Chatwani et al. |
| 2007/0179848 | A1 | 8/2007 | Jain et al. |
| 2007/0260495 | A1 | 11/2007 | Mace et al. |
| 2008/0059331 | A1 | 3/2008 | Schwab |
| 2009/0113475 | A1 | 4/2009 | Li |
| 2009/0304267 | A1 | 12/2009 | Tapley et al. |
| 2010/0076867 | A1 | 3/2010 | Inoue et al. |
| 2010/0086192 | A1 | 4/2010 | Grigsby et al. |
| 2010/0214302 | A1 | 8/2010 | Melcher et al. |
| 2011/0099085 | A1 | 4/2011 | Hamilton et al. |
| 2012/0265744 | A1 | 10/2012 | Berkowitz et al. |
| 2013/0198183 | A1 | 8/2013 | Clendinning et al. |
| 2013/0297437 | A1 | 11/2013 | Hamilton et al. |
| 2014/0304220 | A1 | 10/2014 | Clendinning et al. |
| 2014/0372244 | A1 | 12/2014 | Grove et al. |
| 2015/0310525 | A1 | 10/2015 | Hamilton et al. |
| 2016/0027086 | A1 | 1/2016 | Clendinning et al. |

OTHER PUBLICATIONS

U.S. Appl. No. 14/318,525, filed Jun. 27, 2014, Method and System to Generate a Listing in a Network-Based Commerce System, U.S. Pat. No. 9,704,194.
U.S. Appl. No. 11/426,993, filed Jun. 28, 2006, Editable Electronic Catalogs.
U.S. Appl. No. 12/605,212, filed Oct. 23, 2009, Product Identification Using Multiple Services, U.S. Pat. No. 8,301,512.
U.S. Appl. No. 13/663,178, filed Oct. 29, 2012, Product Identification Using Multiple Services, U.S. Pat. No. 9,076,173.
"U.S. Appl. No. 10/648,125, Advisory Action dated Feb. 11, 2009", 3 pgs.
"U.S. Appl. No. 10/648,125, Advisory Action dated Jun. 9, 2005", 4 pgs.
"U.S. Appl. No. 10/648,125, Appeal Brief filed Jul. 16, 2010", 35 pgs.
"U.S. Appl. No. 10/648,125, Appeal Decision dated Jan. 30, 2014", 12 pgs.
"U.S. Appl. No. 10/648,125, Decision on Pre-Appeal Brief Request dated Apr. 16, 2010", 2 pgs.
"U.S. Appl. No. 10/648,125, Examiner Interview Summary filed Jun. 12, 2014", 1 pg.
"U.S. Appl. No. 10/648,125, Examiner Interview Summary dated Jan. 6, 2006", 3 pgs.
"U.S. Appl. No. 10/648,125, Examiner Interview Summary dated Mar. 28, 2014", 2 pgs.
"U.S. Appl. No. 10/648,125, Examiner Interview Summary dated Oct. 16, 2008", 2 pgs.
"U.S. Appl. No. 10/648,125, Examiner's Answer to Appeal Brief dated Oct. 14, 2010", 47 pgs.
"U.S. Appl. No. 10/648,125, Final Office Action dated Jan. 4, 2010", 39 pgs.
"U.S. Appl. No. 19/648,125, Final Office Action dated Jan. 9, 2006", 29 pgs.
"U.S. Appl. No. 10/648,125, Final Office Action dated Mar. 24, 2005", 19 pgs.
"U.S. Appl. No. 10/648,125 Final Office Action dated Jul. 24, 2007", 27 pgs.
"U.S. Appl. No. 10/648,125, Final Office Action dated Oct. 10, 2008", 56 pgs.
"U.S. Appl. No. 10/648,125, Final Office Action dated Dec. 4, 2008", 33 pgs.
"U.S. Appl. No. 10/648,125, Non Final Office Action dated Feb. 21, 2008", 53 pgs.
"U.S. Appl. No. 10/648,125, Non Final Office Action dated May 13, 2009", 36 pgs.
"U.S. Appl. No. 10/648,125, Non Final Office Action dated Aug. 25, 2005", 14 pgs.
"U.S. Appl. No. 10/648,125, Non Final Office Action dated Sep. 1, 2004", 22 pgs.

(56) References Cited

OTHER PUBLICATIONS

"U.S. Appl. No. 10/648,125, Non Final Office Action dated Dec. 7, 2006", 27 pgs.
"U.S. Appl. No. 10/648,125, Notice of Allowance dated Apr. 21, 2014", 14 pgs.
"U.S. Appl. No. 10/648,125, Pre-Appeal Brief Request dated Mar. 4, 2010", 5 pgs.
"U.S. Appl. No. 10/648,125, Reply Brief filed Mar. 26, 2014", 65 pgs.
"U.S. Appl. No. 10/648,125, Reply Brief filed Nov. 2, 2010", 10 pgs.
"U.S. Appl. No. 19/648,125, Response filed Jan. 3, 2005 to Non Final Office Action dated Sep. 1, 2004", 18 pgs.
"U.S. Appl. No. 10/648,125, Response filed Feb. 4, 2009 to Final Office Action dated Dec. 4, 2008", 13 pgs.
"U.S. Appl. No. 10/648,125, Response filed Mar. 4, 2009 to Final Office Action dated Dec. 4, 2008", 14 pgs.
"U.S. Appl. No. 10/648,125, Response filed May, 7, 2007 to Non Final Office Action dated Dec. 7, 2006", 14 pgs.
"U.S. Appl. No. 10/648,125, Response filed May 24, 2005 to Final Office Action dated Mar. 24, 2005", 21 pgs.
"U.S. Appl. No. 10/648,125, Response filed Jun. 23, 2008 to Non Final Office Action dated Feb. 21, 2008", 19 pgs.
"U.S. Appl. No. 10/648,125, Response filed Jul. 10, 2006 to Final Office Action dated Jan. 9, 2006", 14 pgs.
"U.S. Appl. No. 10/648,125, Response filed Jul. 25, 2005 to Advisory Action dated Jun. 9, 2005", 9 pgs.
"U.S. Appl. No. 10/648,125, Response filed Sep. 14, 2009 to Non Final Office Action dated May 13, 2009", 14 pgs.
"U.S. Appl. No. 10/648,125, Response filed Oct. 30, 2007 to Final Office Action dated Jul. 24, 2007", 13 pgs.
"U.S. Appl. No. 10/648,125, Response filed Dec. 16, 2005 to Non Final Office Action dated Aug. 25, 2005", 9 pgs.
"U.S. Appl. No. 11/426,993, Advisory Action dated Feb. 12, 2014", 3 pgs.
"U.S. Appl. No. 11/426,993, Final Office Action dated Jun. 30, 2015", 8 pgs.
"U.S. Appl. No. 11/426,993, Final Office Action dated Jul. 22, 2010", 17 pgs.
"U.S. Appl. No. 11/426,993, Final Office Action dated Aug. 11, 2016", 9 pgs.
"U.S. Appl. No. 11/426,993, Final Office Action dated Sep. 4, 2013", 14 pgs.
"U.S. Appl. No. 11/426,993 Final Office Action dated Sep. 16, 2011", 16 pgs.
"U.S. Appl. No. 11/426,993, Final Office Action dated Nov. 7, 2012", 14 pgs.
"U.S. Appl. No. 11/426,993, Non Final Office Action dated Jan. 14, 2016", 8 pgs.
"U.S. Appl. No. 11/426,993, Non Final Office Action dated Feb. 24, 2010", 22 pgs.
"U.S. Appl. No. 11/426,993, Non Final Office Action dated Mar. 29, 2013", 15 pgs.
"U.S. Appl. No. 11/426,993, Non Final Office Action dated May 23, 2014", 19 pgs.
"U.S. Appl. No. 11/426,993, Non Final Office Action dated Jun. 21, 2012", 17 pgs.
"U.S. Appl. No. 11/426,993, Non Final Office Action dated Dec. 15, 2014", 6 pgs.
"U.S. Appl. No. 11/426,993, Non Final Office Action dated Dec. 23, 2010", 18 pgs.
"U.S. Appl. No. 11/426,993, Response filed Jan. 7, 2010 to Restriction Requirement dated Dec. 7, 2009", 5 pgs.
"U.S. Appl. No. 11/426,993, Response filed Feb. 6, 2013 to Final Office Action dated Nov. 7, 2012", 9 pgs.
"U.S. Appl. No. 11/426,993, Response filed Mar. 4, 2014 to Final Office Action dated Sep. 4, 2013" 11 pgs.
"U.S. Appl. No. 11/426,993, Response Filed Apr. 14, 2016 to Non Final Office Action dated Jan. 14, 2016", 14 pgs.
"U.S. Appl. No. 11/426,993, Response filed Apr. 15, 2015 to Non Final Office Action dated Dec. 15, 2014", 21 pgs.
"U.S. Appl. No. 11/426,993, Response filed Apr. 28, 2010 to Non Final Office Action dated Feb. 24, 2010", 10 pgs.
"U.S. Appl. No. 11/426,993, Response filed Jun. 23, 2011 to Non Final Office Action dated Dec. 23, 2010", 8 pgs.
"U.S. Appl. No. 11/426,993, Response filed Jun. 27, 2013 to Non Final Office Action dated Mar. 29, 2013", 8 pgs.
"U.S. Appl. No. 11/426,993, Response filed Sep. 9, 2012 to Non Final Office Action dated Jun. 21, 2012", 10 pgs.
"U.S. Appl. No. 11/426,993, Response filed Sep. 23, 2014 to Non Final Office Action dated May 23, 2014", 13 pgs.
"U.S. Appl. No. 11/426,993, Response filed Oct. 15, 2010 to Final Office Action dated Jul. 22, 2010", 43 pgs.
"U.S. Appl. No. 11/426,993, Response filed Oct. 30, 2015 to Final Office Action dated Jun. 30, 2015", 16 pgs.
"U.S. Appl. No. 11/426,993, Response filed Nov. 4, 2013 to Final Office Action dated Sep. 4, 2013", 10 pgs.
"U.S. Appl. No. 11/426,993, Response filed Dec. 15, 2011 to Final Office Action dated Sep. 16, 2011", 9 pgs.
"U.S. Appl. No. 11/426,993, Restriction Requirement Dec. 7, 2009", 8 pgs.
"U.S. Appl. No. 12/605,212, Non Final Office Action dated Feb. 16, 2012", 11 pgs.
"U.S. Appl. No. 12/605,212 Notice of Allowance dated Jun. 28, 2012", 12 pgs.
"U.S. Appl. No. 12/605,212, Response filed May 16, 2012 to Non Final Office Action dated Feb. 16, 2012", 8 pgs.
"U.S. Appl. No. 13/663,178, Examiner Interview Summary dated Nov. 28, 2014", 3 pgs.
"U.S. Appl. No. 13/663,178, Non Final Office Action dated Oct. 3, 2014", 18 pgs.
"U.S. Appl. No. 13/663,178, Notice of Allowance dated Mar. 3, 2015", 10 pgs.
"U.S. Appl. No. 13/663,178 Response filed Jan. 5, 2015 to Non Final Office Action dated Oct. 3, 2014", 14 pgs.
"U.S. Appl. No. 14/318,525, Advisory Action dated Jun. 9, 2016", 4 pgs.
"U.S. Appl. No. 14/318,525, Applicant Interview Summary filed Aug. 1, 2016", 1 pg.
"U.S. Appl. No. 14/318,525, Final Office Action dated Mar. 31, 2016", 28 pgs.
"U.S. Appl. No. 14/318,525, Final Office Action dated May 28, 2015", 20 pgs.
"U.S. Appl. No. 14/318,525, Non Final Office Action dated Feb. 12, 2015", 19 pgs.
"U.S. Appl. No. 14/318,525, Non Final Office Action dated Jan. 1, 2016", 43 pgs.
"U.S. Appl. No. 14/318,525, Non Final Office Action dated Sep. 24, 2015", 31 pgs.
"U.S. Appl. No. 14/318,525, Notice of Allowance dated Mar. 10, 2017", 13 pgs.
"U.S. Appl. No. 14/318,525, Preliminary Amendment filed Jun. 30, 2014", 8 pgs.
"U.S. Appl. No. 14/318,525, Response filed Jan. 3, 2017 to Non Final Office Action dated Sep. 1, 2016", 20 pgs.
"U.S. Appl. No. 14/318,525, Response filed Jan. 25, 2016 to Non Final Office Action dated Sep. 24, 2015", 13 pgs.
"U.S. Appl. No. 14/318,525, Response filed May 12, 2015 to Non Final Office Action dated Feb. 12, 2015", 14 pgs.
"U.S. Appl. No. 14/318,525, Response filed May 31, 2016 to Final Office Action dated Mar. 31, 2016", 14 pgs.
"U.S. Appl. No. 14/318,525, Response filed Aug. 28, 2015 to Non Final Office Action dated May 28, 2015", 16 pgs.
"U.S. Appl. No. 14/318,525 Supplemental Preliminary Amendment filed Aug. 14, 2014", 3 pgs.
"U.S. Appl. No. 14/792,133, Notice of Non-Compliant Amendment dated Oct. 20, 2015", 2 pgs.
"U.S. Appl. No. 14/792,133, Preliminary Amendment filed Oct. 8, 2015".
"U.S. Appl. No. 14/792,133, Response to Notice of Non-Compliant Amendment filed Oct. 26, 2015", 5 pgs.

(56) References Cited

OTHER PUBLICATIONS

"International Application Serial No. PCT/US03/41543, Demand for Preliminary Examination dated Jun. 10, 2004", 5 pgs.

"International Application Serial No. PCT/US03/41543, International Preliminary Report dated Apr. 27, 2005", 6 pgs.

"International Application Serial No. PCT/US03/41543, Written Opinion dated Aug. 26, 2004", 9 pgs.

"International Application Serial No. PCT/US2006/044944, International Preliminary Report on Patentability dated Jun. 5, 2008", 5 pgs.

"International Application Serial No. PCT/US2006/044944, International Search Report dated May 10, 2007", 2 pgs.

"International Application Serial No. PCT/US2006/044944, Written Opinion dated May 10, 2007", 3 pgs.

"MyComicShop.com", Search for Mad (Magazine #23 on) #158, [Online]. Retrieved from the Internet: <http://www.mycomicshop.com/search?tid=353271&pgi=151>, (Accessed Feb. 10, 2012), 22 pgs.

"New Text and Social Messaging Features Expand Frucall's Voice Based", Primezone, (Aug. 31, 2006), 1 pg.

Kotas, Paul, et al., "Use of Electronic Catalog to Facilitate User-to-User Sales", U.S. Appl. No. 60/336,409, filed Oct. 31, 2001, 48 pgs.

\* cited by examiner

LISTINGS TABLE

ID

DESCRIPTION

CATEGORY ID

PRICE

CLOSE DATE

RESERVE_PRICE

SELLER_ID

BIDDER_ID (0->N)

LIST_DATE

REMINDER_SENT

Fig. 3

XYZ Motors
Home    Browse    Sell    Enthusiasts    Search    Services    Help

Lost your information? Click Refresh. Learn how to stop information loss.

Sell Your Item: Choose a Listing Option

1. Catagory    2. Title    3. Pictures    4. Payment    5. Review &
              & Description  & Details    & Shipping    Submit

New! Listing a 1990 or newer vehicle?    (or) Listing a 1989 or older vehicle?
Save time listing your vehicle's options         Use for older vehicles - OR - if you prefer
with this new feature.                           the standard listing form.

Enter Vehicle Identification Number (VIN):

152 — [           ]  [Continue >] ~154        [Continue >]
     17 character limit                            )
                                                  156
     Vehicle Identification Number
     [WP0AB29911S685546]
           Can be found in:
           ○ driver's side dashboard
           ○ driver's side doorjamb
           ○ insurance card or registration How to find your VIN Number Home    Browse    Sell    Enthusiasts    Search    Services    Help

XYZ Motors
Home   Browse   Sell   Enthusiasts   Search   Services   Help

Lost your information? Click Refresh . Learn how to stop information loss.

Sell Your Item: Choose a Listing Option

| 1. Category | 2. Title & Description | 3. Pictures & Details | 4. Payment & Shipping | 5. Review & Submit |

8 possible styles found for VIN "WX1234987XLODK2"
Select the one you would like to sell below or try again
Didn't find what you're looking for? List the standard way.

1999 Ford F-150 Series 139" LARIAT Supercab       [ Sell one like this ]
1999 Ford F-150 Series 157" LARIAT Supercab       [ Sell one like this ] — 162
1999 Ford F-150 Series FLARESIDE 139" LARIAT Supercab   [ Sell one like this ]
1999 Ford F-150 Series FLAREDIDE 139" LARIAT Supercab   [ Sell one like this ] — 162
1999 Ford F-150 Work Series 139" Supercab         [ Sell one like this ]
1999 Ford F-150 Work Series 157" Supercab         [ Sell one like this ] — 162
1999 Ford F-150 Series 139" XL Supercab           [ Sell one like this ]
1999 Ford F-150 Series 157" XL Supercab           [ Sell one like this ] — 162

Home   Browse   Sell   Enthusiasts   Search   Services   Help

Fig. 9

Vehicle Data and Attributes Section

Item Specifics  
2000 Porsche Boxter Roadster 2-door  [Change vehicle]

Vehicle Identification Number (VIN): WPOCA298XYU626870  
17 character limit

Milage *: [_____] miles

Exterior Color *: [Please choose one ▼]  
Interior Color *: [Please choose one ▼]

Standard Equipment *
- ☑ 2 Wheel drive           ☑ 5 Speed
- ☑ Rear Spoiler            ☑ Power Seat Driver
- ☑ Auto Climate Control    ☑ Cassette
- ☑ Automatic transmission  ☑ Driver Airbag
- ☑ Side air bag            ☑ AM/FM Radio
- ☑ Passenger Airbag        ☑ Cassette
- ☑ Leather seats           ☑ Convertible
- ☑ Anti Lock Brakes        ☑ Power Windows
- ☑ Power Door Locks Optional Equipment
- ☐ After Mkt Options       ☐ Heated Seats
- ☐ CD                      ☐ Integrated Phone
- ☐ CD Changer              ☐ Power Door Locks
- ☐ Cruise Control          ☐ Premium Sound
- ☐ Custom Paint            ☐ Telescoping Wheel
- ☐ Full Leather            ☐ Tonneau
- ☐ Hard Top                ☐ Traction Control
- ☐ Hard Top                ☐ Traction Control Wheels *: [Alloy Wheels (Standard) ▼]  
Air conditioning *: [Auto Climate Control ▼]  
Package *: [None ▼]  
Drivetrain *: [2 Wheel Drive (Standard) ▼]  
Transmission *: [5 Speed (Standard) ▼]  
Spoiler *: [Rear Spoiler (Standard) ▼]  
Power Seat *: [Power Seat Driver (Standard) ▼]

Is there an Existing Warranty? *  
○ Vehicle does have an existing warranty. (specify details in Description)  
⦿ Vehicle does NOT have an existing warranty.

How do I determine my vehicle's warranty?

Fig. 10

Item Specifics

192

194
1999 Porsche Boxster S 2 - Door 5 CYLINDER 2.7 LITER

Change vehicle

Vehicle Identification
Number (VIN)    [WPOCA298XYU626870] ~196
                17 character limit Learn more about how
Item Specifics can help
you sell your item.

What is a VIN?

Mileage *       [        ] miles          If in kilometers please
                                          convert to miles.

Exterior Color * [Please Choose one ▽]

Fig. 11

2000 Porsche: Boxster
Silver on Tan Boxster

| | | | |
|---|---|---|---|
| Miles: | 19860 | VIN Number: | WPOCA298XYU626870 |
| Engine: | 6 Cylinder 2.7 Liter | Title: | Clear |
| Transmission: | Automatic | Interior: | Beige/Tan |
| Warranty: | Existing | Exterior: | Silver |

Standard Equipment:
| | | |
|---|---|---|
| ABS | Convertible | Power Seat Driver | Alloy Wheels |
| AM/FM Radio | Dual Air Bags | Power Steering | Auto Climate Control |
| Cassette | Leather | Power Windows | Rear Spoiler |

Optional Equipment:
| | | |
|---|---|---|
| After Market Options | Cruise Control | Hard Top | Power Door Locks |
| CD | Custom Paint | Heated Seats | Premium Sound |
| CD Changer | Full Leather | Integrated Phone | Telescoping Wheel |

Condition Report:
No Accident History   Normal Wear on Interior Condition
No Rust   See Description for Known Mechanical Problems
Like New on Exterior Seller ......assumes full responsibility for the content of this listing and the item offered.

Vehicle Description
Looks that kill  Performance that Excites! This Year 2000 Boxster is immaculate and in excellent shape.  Everyone see's or rides in this Car and give the thumbs up. I ordered it specifically for these colors and 'wow' does it look rich. In fact, it drives and performs even richer. If you like the Silver on Tan and you want a car that makes no noise or rattling while only humming to the beauty and purity of the Porsche engine, this is the Car for you. It has been for me. When the top is down you'll enjoy the weather and you will see the world in a whole new way.  This Porsche is the Playmate of the 21st Century !!!

Vehicle Condition
Phenomenal Shape ! Exterior: Not a Dent nor Scratch. Interior: Doesn't look driven. Engine: Purrs like a Kitten.

Terms of Sale
Payment Terms 'I would like a 10% deposit within 3 days of close of auction' 'Balance to be paid within 10 days of close of auction ''. I accept payment by money order' Delivery Terms 'Buyer to pay for shipping of the vehicle'' I will arrange to deliver the car within 100 miles of Deerfield Beach, FL.

[ Close Window ]

Fig. 12

Description

2001 Acura: CL
2001 ACURA CL, Great Condition

| | | | |
|---|---|---|---|
| Miles: | 19000 | VIN Number: | WPOCA296XYU626870 |
| Engine: | 6 Cylinder 2.7 Liter | Title: | Clear |
| Transmission: | Automatic | Interior: | Beige/Tan |
| Warranty: | Existing | Exterior: | Silver |

Standard Equipment:

| | | | |
|---|---|---|---|
| ABS | Convertible | Power Seat Driver | Alloy Wheels |
| AM/FM Radio | Dual Air Bags | Power Steering | Auto Climate Control |
| Cassette | Leather | Power Windows | Rear Spoiler |

Optional Equipment:

| | | | |
|---|---|---|---|
| After Market Options | Cruise Control | Hard Top | Power Door Locks |
| CD | Custom Paint | Heated Seats | Premium Sound |
| CD Changer | Full Leather | Integrated Phone | Telescoping Wheel |

Condition Report:
No Accident History   Normal Wear on Interior Condition
No Rust   See Description for Known Mechanical Problems
Like New on Exterior Seller .......assumes full responsibility for the content of this listing and the item offered.

Trim: 3.2 Coupe 2D Engine: V6 3.2 Liter VTEC transmission: Automatic Drivetrain: Front Wheel Drive Mileage: 35,279 Leather Air Conditioning Power Steering Power Windows Power Mirrors Power Door Locks Dual Powere Seats Moon Roof Cruise Control Tilt Wheel AM/FM Stereo Cassette CD Changer Bose Brand Premium Sound Dual Front Air Bags ABS (4-Wheel) Traction Control Alloy Wheels

XYZ Motors
Home    Browse    Sell    Enthusiasts    Search    Services    Help

Lost your information? Click Refresh. Learn how to stop information loss.

Revise Your Item: Describe Your Item

1. Category    2. Title & Description    3. Pictures & Details    4. Payment & Shipping    5. Review & Submit

Item Title: GTO Turbo

Item Description
Add to your description in the box below, then click "Save Changes."
Remember: You can only add to, not change your current description.
View your current description

Add To Description *

[Font Name ▽]    [Font Size ▽]    [Color ▽]

[B] [I] [U] [≡] [≡] [≡]  1— 2— 3—  □—  ☐ View as HTML

Preview your revised description

[Cancel Changes]    [Save Changes]

Home    Browse    Sell    Enthusiasts    Search    Services    Help

XYZ Motors
Home   Browse   Sell   Enthusiasts   Search   Services   Help

Lost your information? Click Refresh. Learn how to stop information loss.

Revise Your Item: Describe Your Item

| 1. Category | 2. Title & Description | 3. Pictures & Details | 4. Payment & Shipping | 5. Review & Submit |

Item Title: Porsche :Boxster
Item Subtitle: 2000 Silver New Condition

Item Specifics

2000 Porsche Boxster Roadster 2-door

Vehicle Identification Number (VIN)    WPOCA298XYU626870

Learn more about how Item Specifics can help you sell your item

Mileage *          12000 miles
Exterior Color *   Silver
Interior Color *   Black Standard Equipment *

- ✓ 2 Wheel drive
- ✓ Rear Spoiler
- ✓ Auto Climate Control
- ✓ Automatic transmission
- ✓ Side air bag
- ✓ Passenger Airbag
- ✓ Leather seats
- ✓ Anti Lock Brakes
- ✓ Power Door Locks

- ✓ 5 Speed
- ✓ Power Seat Driver
- ✓ Cassette
- ✓ Driver Airbag
- ✓ AM/FM Radio
- ✓ Cassette
- ✓ Convertible
- ✓ Power Windows How do I find out what options my car has?

Optional Equipment *

- ☐ After Mkt Options
- ☐ CD
- ☐ CD Changer
- ☐ Cruise Control
- ☐ Custom Paint
- ☐ Full Leather
- ☐ Hard Top
- ☐ Hard Top

- ☐ Heated Seats
- ☐ Integrated Phone
- ☐ Power Door Locks
- ☐ Premium Sound
- ☑ Telescoping Wheel
- ☐ Tonneau
- ☐ Traction Control
- ☐ Traction Control

Fig. 16A

| | |
|---|---|
| Wheels * | Alloy Wheels (Standard) |
| Air conditioning * | Auto Climate Control |
| Package * | None |
| Drivetrain * | 2 Wheel Drive (Standard) |
| Transmission * | 5 Speed (Standard) |
| Spoiler * | Rear Spoiler (Standard) |
| Power Seat * | Power Seat Driver (Standard) |
| Is there an Existing Warranty? * | Vehicle does NOT have an existing warranty. |
| Type of Vehicle This * | Clear (most titles) |
| Vehicle Inspection * | None or Other inspection service |

Vehicle Condition

| | |
|---|---|
| Maintanance History Available | See Description |
| Interior Condition | See Description |
| Exterior Condition | See Description |
| Rust? | See Description |
| | If you answer yes, please provide details in the item description. |

Vehicle Description

Add to your description in the box below, then click "Save Changes."
Remember: You can only add to, not change your current description.
<u>View your current description</u>

Add To Description *

[Font Name ▽]  [Font Size ▽]  [Color ▽]

[B] [I] [U] [≡] [≡] [≡] | 1— 2— 3— □— | ⇥ ⇤ | 🖼    ☐ View as HTML

[                                                                ]

<u>Preview your revised description</u>

[Cancel Changes]   [Save Changes]

<u>Home</u>   <u>Browse</u>   <u>Sell</u>   <u>Enthusiasts</u>   <u>Search</u>   <u>Services</u>   <u>Help</u>

Fig. 16B

METHOD AND SYSTEM TO GENERATE A LISTING IN A NETWORK-BASED COMMERCE SYSTEM

CROSS REFERENCE TO RELATED APPLICATION

This application is a continuation of U.S. patent application Ser. No. 14/318,525, filed Jun. 27, 2014, which is a continuation of U.S. patent application Ser. No. 10/648,125, filed Aug. 25, 2003, which claims the benefit of U.S. Provisional Patent Application Ser. No. 60/437,199, filed Dec. 31, 2002, the benefit of priority of each of which is claimed hereby, and each are incorporated herein by reference in their entirety.

FIELD OF THE INVENTION

The present invention relates generally to the field of electronic commerce, and more specifically to a method and system to generate a listing in a network-based commerce system.

BACKGROUND

More and more Internet users are realizing the ease and convenience of buying and selling online via a network-based commerce system. Certain such commerce systems are focused on person-to-person trading, and collectors, hobbyists, small dealers, unique listing seekers, bargain hunters, and other consumers, are able to buy and sell millions of listings at various online shopping sites. Such systems also support business-to-person and business-to-business commerce.

The success of a networked-based commerce system may depend upon its ability to provide a user-friendly environment in which buyers and sellers can conduct business efficiently. Current network-based commerce systems have certain limitations in the manner in which a user can post a listing on such systems.

SUMMARY OF THE INVENTION

According to one aspect of the invention, there is provided a method and system of generating a listing in a network-based commerce system. The method includes receiving listing identification data from a user, and retrieving listing data associated with the listing based on the listing identification data. Thereafter, a listing is generated that is at least partially based on the listing data and posted on the network-based commerce system. In one embodiment, the user may edit the listing data prior to posting the listing. The network-based commerce system may include a database of listing data associated with at least one of movies, music, games, books and motor vehicles. In one embodiment, a plurality of check boxes is provided each of which are associated with an attribute of the listing and the method automatically, without human intervention, checks attributes based on the listing data.

Other features of the present invention will be apparent from the accompanying drawings and from the detailed description that follows.

BRIEF DESCRIPTION OF THE DRAWINGS

The invention is now described, by way of example, with reference to the accompanying diagrammatic drawings in which like reference numerals are used to indicate the same or similar features, unless otherwise indicated.

FIG. 3 shows an exemplary listings table of the database of FIG. 2.

FIG. 8 shows an exemplary user interface generated by the method of FIG. 6.

FIG. 9 shows an exemplary user interface for selecting one of a plurality of listings corresponding with a VIN.

FIG. 10 shows an exemplary user interface including a plurality of check boxes for generating the listing.

FIG. 11 shows an exemplary user interface wherein a title for the listing is generated in an automated fashion from the VIN.

FIG. 12 shows portion of an exemplary user interface for previewing the listing prior to posting it on the network-based commerce system.

FIGS. 13A and 13B show an exemplary user interface of a proposed listing presented to a user.

FIGS. 14 to 16B show exemplary user interfaces for editing a posted listing after bids for the listing have been posted.

DETAILED DESCRIPTION

A method and system automatically to generate listings in a network-based commerce system based on reference listing data is described. In the following description, for purposes of explanation, numerous specific details are set forth in order to provide a thorough understanding of the invention. It will be evident, however, to one skilled in the art that the invention may be practiced without these specific details.

For the purposes of the present specification, the term "listing" or "item" may refer to any description, identifier, representation or information pertaining to a listing, service, offering or request that is stored within a network-based commerce system. As such, a listing may be an auction or fixed-price offering (e.g., products such as goods and/or services), an advertisement, or a request for a listing or service.

Transaction Facility

Figure 1:
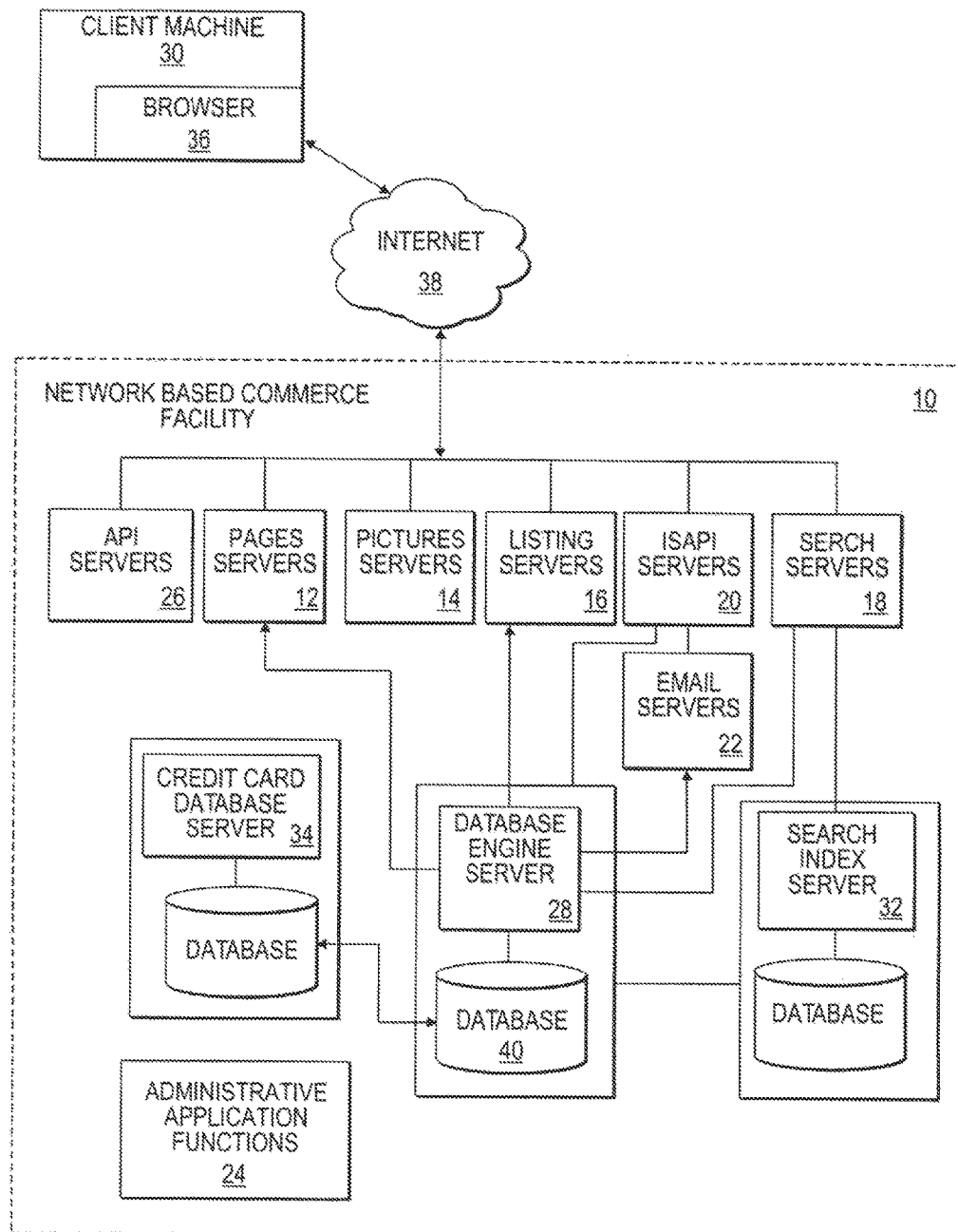
FIG. 1 shows a schematic block diagram of an exemplary network-based commerce system, in accordance with the invention.

FIG. 1 is block diagram illustrating an exemplary network-based commerce system 10. While an exemplary embodiment of the present invention is described within the context of the network-based commerce system 10, the invention will find application in many different types of computer-based, and network-based, facilities (commerce, transaction or otherwise).

The network-based commerce system 10 includes one or more of a number of types of front-end servers that each includes at least one Dynamic Link Library (DLL) to provide selected functionality. The system 10 includes page servers 12 that deliver web pages (e.g., mark-up language documents), picture servers 14 that dynamically deliver images to be displayed within Web pages, listing servers 16 that facilitate category-based browsing of listings, search servers 18 that handle search requests to the system 10 and facilitate keyword-based browsing of listings, and ISAPI servers 20 that provide an intelligent interface to a back-end of the system 10. The system 10 also includes e-mail servers 22 that provide, inter alia, automated e-mail communications to users of the network-based commerce system 10. In one embodiment, one or more administrative application functions 24 facilitate monitoring, maintaining, and managing the system 10. One or more API servers 26 may provide a set of API functions for querying and writing to the network-based commerce system 10. APIs may be called through the HTTP transport protocol. In one embodiment, information is sent and received using a standard XML data format. Applications utilized to interact (e.g., upload transaction listings, review transaction listings, manage transaction listings, etc.) with the network-based commerce system 10 may be designed to use the APIs. Such applications may be in an HTML form or be a CGI program written in C++, Perl, Pascal, or any other programming language.

The page servers 12, API servers 26, picture servers 14, ISAPI servers 20, search servers 18, e-mail servers 22 and a database engine server 28 may individually, or in combination, act as a communication engine to facilitate communications between, for example, a client machine 30 and the network-based commerce system 10; act as a transaction engine to facilitate transactions between, for example, the client machine 30 and the network-based commerce system 10; and act as a display engine to facilitate the display of listings on, for example, the client machine 30.

The back-end servers may include the database engine server 28, a search index server 32 and a credit card database server 34, each of which maintains and facilitates access to a respective database.

In one embodiment, the network-based commerce system 10 is accessed by a client program, such as for example a browser 36 (e.g., the Internet Explorer distributed by Microsoft Corp. of Redmond, Wash.) that executes on the client machine 30 and accesses the network-based commerce system 10 via a network such as, for example, the Internet 38. Other examples of networks that a client may utilize to access the network-based commerce system 10 include a wide area network (WAN), a local area network (LAN), a wireless network (e.g., a cellular network), the Public Switched Telephone Network (PSTN) network, or the like. The client program that executes on the client machine 30 may also communicate with the network-based commerce system 10 via the API servers 26.

Database Structure

Figure 2:
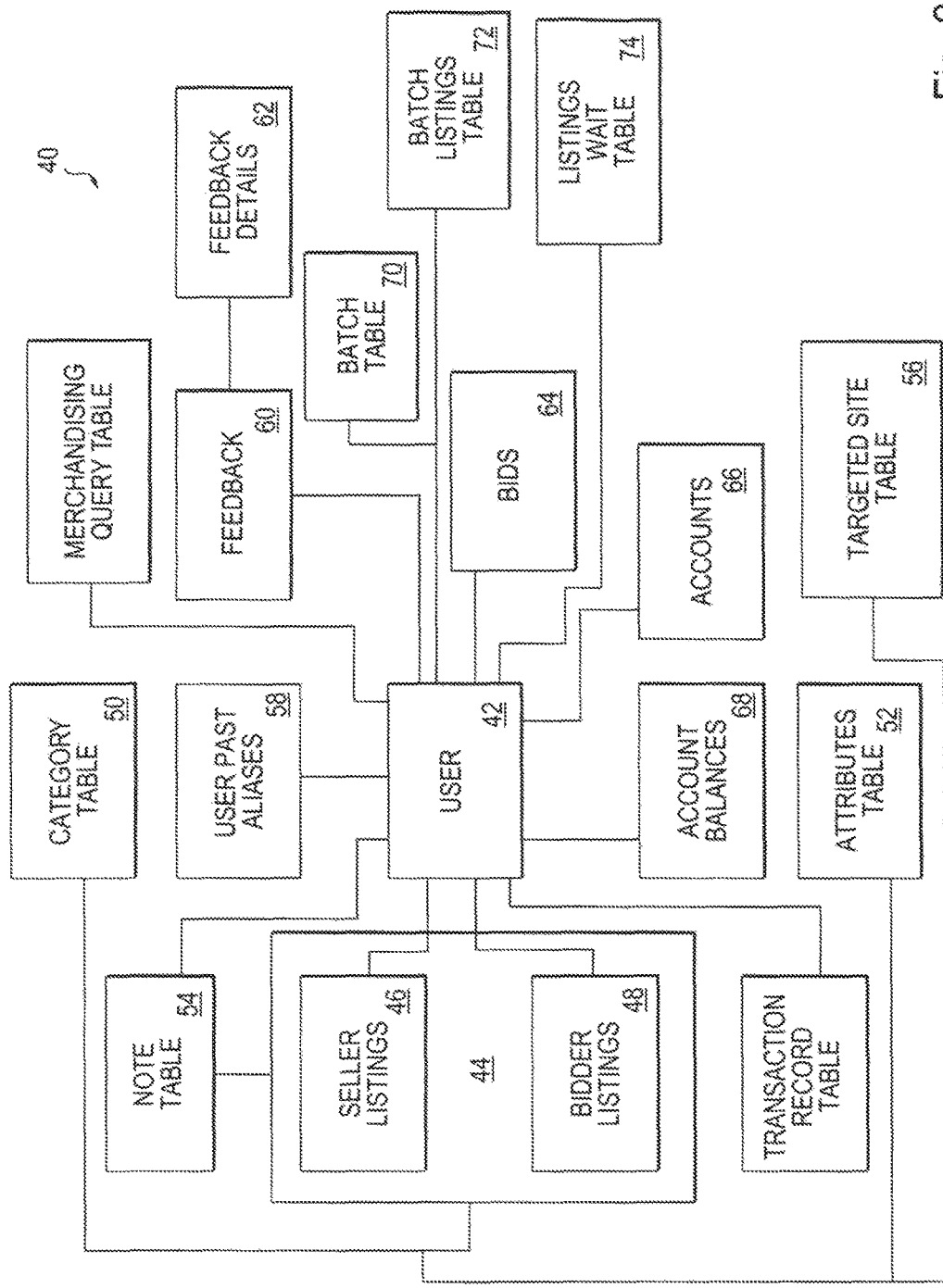
FIG. 2 shows exemplary tables of a database of the system of FIG. 1.

FIG. 2 is a database diagram illustrating an exemplary database 40, maintained by and accessed via the database engine server 28, which at least partially implements and supports the network-based commerce system 10. In one embodiment, the database engine server 28 may maintain two databases, a first database being maintained for listing (or offering) information that is not included within a virtual "store", and a second database for listing (or offering) information that is presented via a virtual "store" supported by the network-based commerce system 10.

The database 40 may, in one embodiment, be implemented as a relational database, and includes a number of tables having entries, or records, that are linked by indices and keys. In an alternative embodiment, the database 40 may be implemented as collection of objects in an object-oriented database.

The database 40 (see FIG. 2) includes a user table 42 that contains a record for each user of the network-based commerce system 10. A user may operate as a seller, a buyer, or both, when utilizing the network-based commerce system 10. The database 40 also includes listings tables 44 that may be linked to the user table 42. The listings tables 44 may include a seller listings table 46 and a bidder listings table 48. A user record in the user table 42 may be linked to multiple listings that are being, or have been, listed or offered for sale via the network-based commerce system 10. In one embodiment, a link indicates whether the user is a seller or a bidder (or buyer) with respect to listings for which records exist within the listings tables 44. An exemplary listings table is also shown in FIG. 3.

The database 40 also includes one or more divisions in the form of categories provided in category tables 50. Each record within the category table 50 may describe a respective category. In one embodiment, listings provided by the system 10 are arranged in the categories. These categories may be navigable by a user of the network-based commerce system 10 to locate listings in specific categories. Thus, categories provide a mechanism to locate listings that may be browsed. In addition or instead, an alphanumeric search mechanism may be provided by the search servers 20 to allow a user to search for specific listings using search terms or phrases. In one embodiment, the category table 50 describes multiple, hierarchical category data structures, and includes multiple category records, each of which describes the context of a particular category within the multiple hierarchical category structures. For example, the category table 50 may describe a number of real, or actual, categories to which listing records, within the listings tables 44, may be linked.

The database 40 also includes one or more attributes tables 52. Each record within the attributes table 52 describes a respective attribute associated with a listing. In one embodiment, the attributes table 52 describes multiple, hierarchical attribute data structures, and includes multiple attribute records, each of which describes the context of a particular attribute within the multiple hierarchical attribute structures. For example, the attributes table 52 may describe a number of real, or actual, attributes to which listing records, within the listings tables 44, may be linked. Also, the attributes table 52 may describe a number of real, or actual, attributes to which categories, within the category table 50, may be linked.

The database 40 may also include a note table 54 populated with note records that may be linked to one or more listing records within the listings tables 44 and/or to one or more user records within the user table 42. Each note record within the note table 54 may include, inter alia, a comment, description, history or other information pertaining to a listing being offered via the network-based commerce system 10, to a user of the network-based commerce system 10. The database 40 may also include a targeted site table 56 populated with targeted site records that may be linked to one or more listing records within the listings tables 44 and/or to one or more user records within the user table 42.

A number of other exemplary tables may also be linked to the user table 42, namely a user past aliases table 58, a feedback table 60, a feedback details table 62, a bids table 64, an accounts table 66, and an account balances table 68. In one embodiment, the database 40 also includes a batch table 70, a batch listings table 72, and a listings wait table 74.

It will be appreciated that the success of a seller in, for example, selling a listing may be dependent upon the listing information provided when the listing is posted to the network-based commerce system.

Generating a Listing

Figure 4:
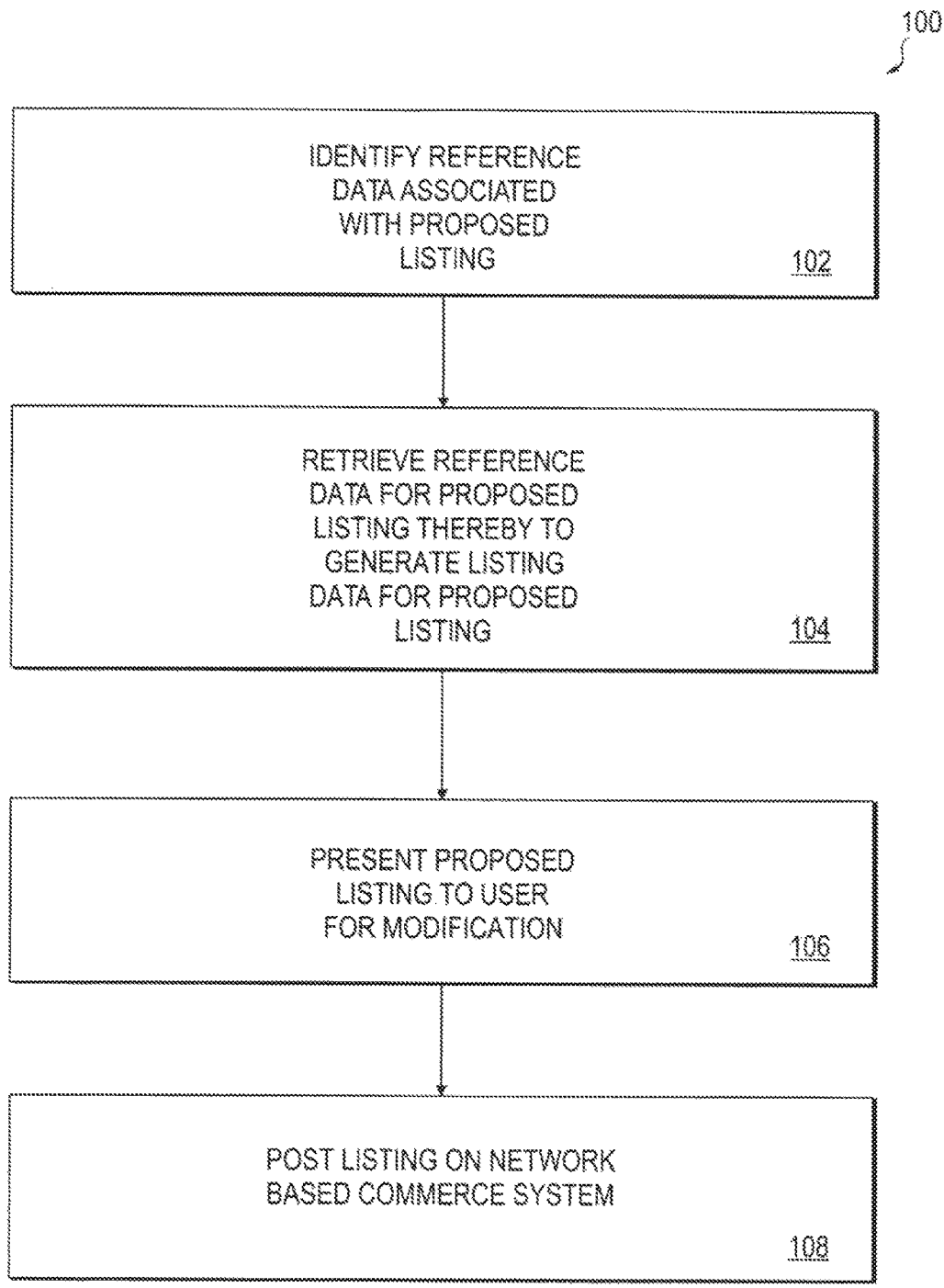
FIG. 4 shows a schematic flow diagram of a method, in accordance with the invention, to generate a listing in a network-based commerce system.

Referring in particular to FIG. 4, reference numeral 100 generally indicates a method, in accordance with the invention, of generating a listing in the exemplary network-based commerce system 10. In one embodiment, the method 100 automatically populates fields (e.g., includes listing information) of a listing submitted to the network-based commerce system 10 by a user. Although the method 100 may be used to post listings for any type of listing (e.g., products including goods and/or services, advertisements, and so on) its application in posting listings for the sale of motor vehicles in an auction based commerce system is described herein by way of example.

As shown at Block 102, the method 100, broadly, identifies reference data associated with the proposed listing and, thereafter, retrieves the reference listing data for the proposed listing from a reference data store and then, in an automated fashion, generates listing data for the proposed listing (see block 104) based on the reference listing data. As will be described in more detail below, the method 100 then presents the proposed listing to the user and allows the user to modify (e.g., edit) the data or information in the proposed listing (see block 106). In one embodiment, the method 100 pre-populates fields of a web page with appropriate data that has been retrieved and then allows the user to modify the data as required. Once the proposed listing has been finalized (and/or accepted) by the user, it may then be posted on the network-based commerce system 10 as shown at block 108.

When the method 100 is applied to listings in the form of motor vehicles (including motorcycles and the like) an identifier such as a Vehicle Identification Number (VIN) may be used to identify the appropriate reference data or information associated with the listing (see block 102). Thus, key data associated with the particular listing (e.g., the vehicle) is provided to the user wishing to list the vehicle in an automated fashion. Accordingly, in one embodiment, a user posting a listing is not confronted with the dilemma as to what information to enter when listing (e.g., selling a car) via the network-based commerce system 10. In one embodiment, the method 100 generates a template suitable for selling a motorcar and the template is then populated with the appropriate reference data identified using the VIN. Further, as reference listing data is retrieved from a reference data source (e.g., a catalogue of VIN data), the integrity of the data provided in the listing is thereby enhanced as the reference data source may be checked and user error is thereby reduced. In certain embodiments, the catalogue of reference listing data is sourced from an appropriate data provider to enhance its accuracy. Accordingly, the data used to populate the template may thus be sourced from an external system. The VIN catalogue data provider may include VIN data substantially similar to that used by dealers, manufacturers, distributors or the like to list vehicles for sale in a wholesale market.

Figure 5:
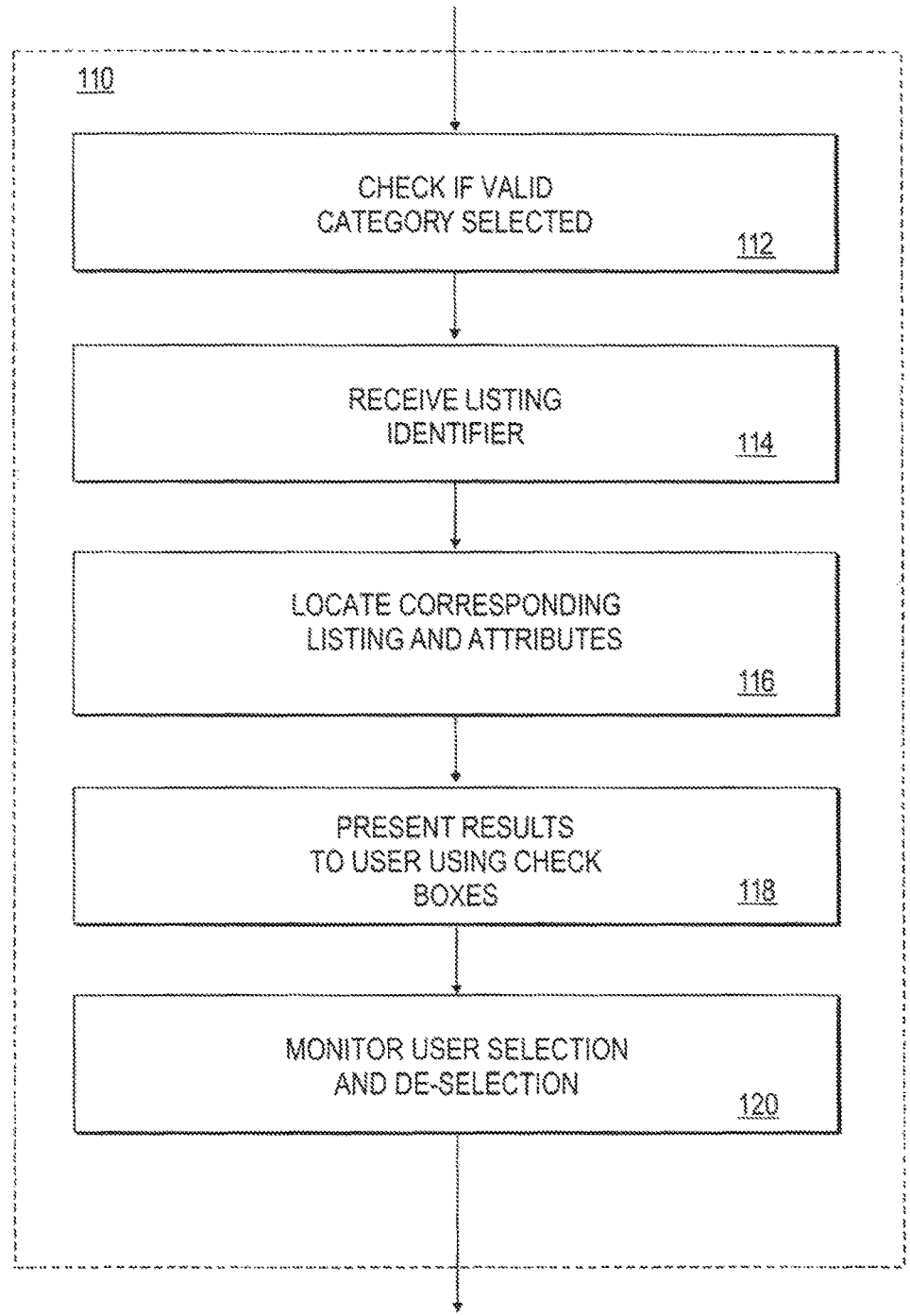
FIG. 5 shows a schematic flow diagram of a further method, in accordance with the invention, to generate a listing.

Reference numeral 110 (see FIG. 5) generally indicates a method, in accordance with the invention, for generating a listing for a motor vehicle using a VIN. In the exemplary network-based commerce system 10, a user may list any item in any one or more of a plurality of categories. However, not all categories may be provided with the automated listing generation functionality. As will be described in more detail below, exemplary categories, in addition to motor vehicles, may include movies, music, and books.

Returning to FIG. 5, as shown at block 112, a check is first conducted to determine if the user selects a valid category which allows automated generation of a proposed listing such as a motor vehicle listing in a motor vehicle category. If a category is selected by the user that does not support automated generation of the proposed listing, then an appropriate message may be communicated to the user. If, however, a supported category is selected (in our present example the motor vehicle category) then, as shown at block 114, the method 110 then receives a listing identifier in the form of a VIN from the user. In certain embodiments, a check may then be conducted to determine whether or not a valid VIN has been entered. Thereafter, the corresponding listing and attribute data (e.g., any data describing the listing) is located (see block 116) and inserted into a predefined template that provides fields for appropriate data. In particular, the template receives the listing and attribute data from the exemplary VIN catalogue and presents the results to a user via a graphic user interface such as a web page (see block 118) including a plurality of check boxes, as described in more detail below. Each check box may correspond to an attribute that the listing may or may not have. Thereafter, the method 110 monitors user selection and de-selection (see block 120) of the check boxes so as to remove attributes that have been retrieved from the VIN catalogue and populated into the template, and/or add attributes not identified using the VIN catalogue sourced, for example, from a VIN Catalogue data provider.

As mentioned above, in one embodiment the attributes (e.g., sound system, leather seats, custom paint, heated seats, hard top, etc.) of the listing are identified in the template using a plurality of check boxes. Accordingly, in this embodiment, the check boxes may be automatically checked based on the VIN using the VIN catalogue. However, as mentioned above, any listing identifier may be used to retrieve any attributes or information relating to a proposed listing. It will be appreciated that different templates may be populated dependent upon the nature of the listing and the category in which it is to be listed.

Figure 6:
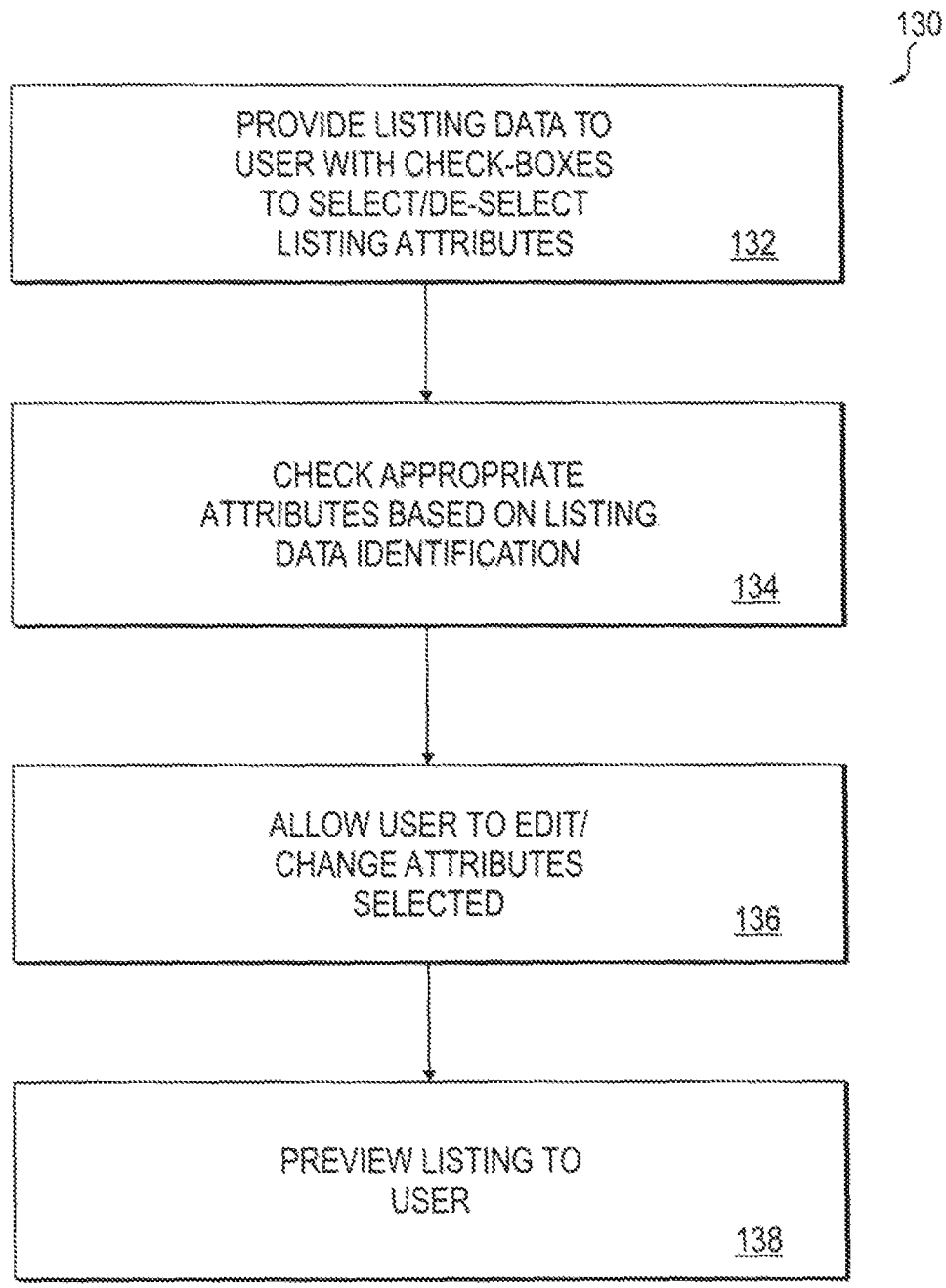
FIG. 6 shows a schematic flow diagram of a method, in accordance with the invention, to generate a listing using a Vehicle Identification Number (VIN) and vehicle attributes.

Reference numeral 130 (see FIG. 6) generally indicates a further method, in accordance with the invention, for generating a listing in a network-based commerce system 10 using a plurality of check boxes which are pre-checked based on an identifier entered by the user and listing data or information stored in a database. At block 132, the method 130 provides a proposed listing to the user with check boxes that identify various attributes associated with the listing. Thereafter, as shown at block 134, the check boxes are automatically checked based on appropriate attributes retrieved from a reference listing database based on listing identification data. The identification data may be a title of a movie, compact disc, UPC code or any other identifier that can be used to identify data associated with the listing. Thereafter, as shown at block 136, after a proposed listing has been presented to the user, the user may then select or de-select any one or more of the check boxes, thereby to modify the proposed listing that has been generated in an automated fashion based on the identification data. Once the user has modified the check boxes as required, then a preview of the proposed listing is presented to the user at block 138 prior to the listing being posted on the network-based commerce system 10.

Figure 7:
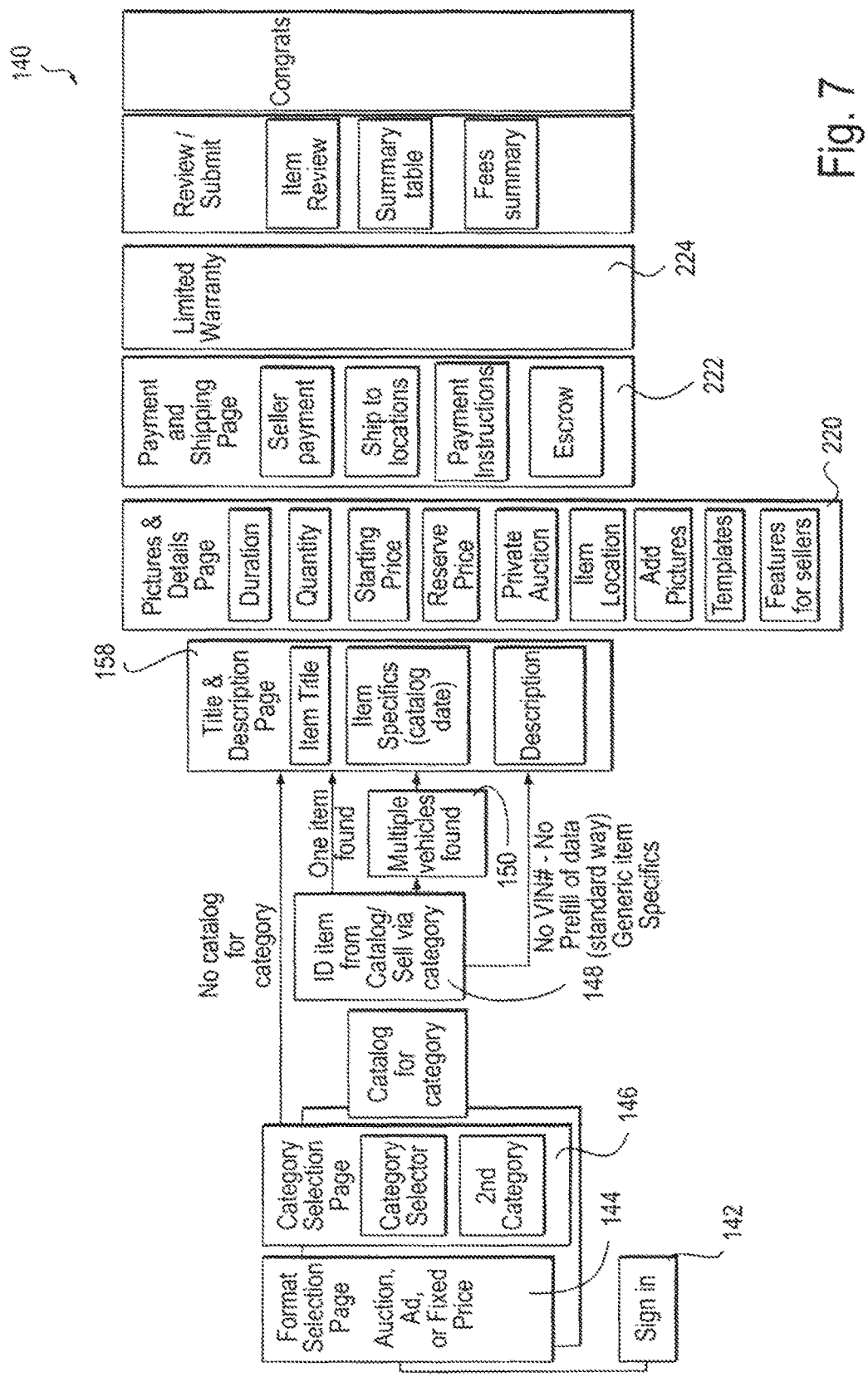
FIG. 7 shows a schematic functional diagram of a method, in accordance with the invention, to post listings in a network-based commerce system.

Referring in particular to FIG. 7, reference numeral 140 generally indicates a method, in accordance to the invention, for a user to post a listing on the network-based commerce system 10 using, for example, the methods 100, 110, and 130. As shown at block 142, the user is first requested to sign in at the network-based commerce system 10 and, thereafter choose the particular format that the user wishes to use for the listing. In one embodiment, the user is provided with an option to select an auction format, an advertisement format, or a fixed price format. Thereafter, as shown at block 146, the user may then select an appropriate category (see block 112 in FIG. 5). In one embodiment, a user is provided with the option to select both a first or main category as well as a second category for the listing.

At block 148, the method provides the user with an option to select a standard or conventional listing procedure, or list using the method 100, in accordance to the invention. If the user selects to list using a conventional listing procedure, the user is then required to populate all fields for the listing manually without automated assistance. However, if the user selects to generate a new listing in an automated fashion using the method 100, then the user at block 148 enters identification data (e.g., the VIN of a vehicle which he or she wishes to list). In one embodiment, a user interface the form of an exemplary web page 150 (see FIG. 8) is presented to the user.

In certain embodiments when the user selects to list a motor vehicle, the network-based commerce system 10 may request a user to identify whether the listing is newer than a predetermined year (e.g., 1990) or older than a predetermined year (e.g., 1989), for example, to accommodate a VIN catalogue that does not include older listings. Further, the web page 150 provides a data entry field 152 for the user to enter the VIN of the vehicle that he or she is wishing to list. In one embodiment, the method 140 checks the validity of the VIN entered by the user.

Thereafter, the method 140 monitors activation or clicking of a "Continue" button 154 in order to proceed with the automated listing functionality. If, however, the user chooses to list a vehicle that is older than the predetermined date (e.g., 1989 or older), no VIN is entered and the user may then immediately activate a "Continue" button 156.

Once the network-based commerce system 10 has received the VIN, and in the event of only a single listing or motor vehicle being found that corresponds to the entered VIN, then the method 140 proceeds directly to a Title and Description operation or block 158. Likewise, if the user enters no VIN and the "Continue" button 156 is activated, then the method 140 also proceeds directly to the Title and Description block 158. If, however, the network-based commerce system 10 locates multiple vehicles associated with the VIN, the method 140 generates a user interface in the form of a web page 160 (see FIG. 9) that identifies all the vehicles found in the VIN catalogue associated with the VIN. Each listing located may include an associated "Sell one like this" button 162 and, using the buttons 162, the user may then select a corresponding listing that is most appropriate to his or her proposed listing.

Returning to FIG. 7, the method 140 then automatically generates a title and description page based on attributes or information retrieved from the VIN catalogue and presents a user interface in the form of a web page 164 (see FIG. 10) including a plurality of check boxes. The check boxes may, for example, be associated with attributes of the particular listing. For example, as generally indicated by reference numeral 166, the web page may be generated by a template including a heading "Standard Equipment" that shows a plurality of different attributes or characteristics associated with the listing. For example, when the listing is a motor vehicle, the attributes may include "2 Wheel Drive", "5 Speed", "Rear Spoiler", "Power Seat Driver", "Auto Climate Control", "Cassette", and so on. Each attribute has an associated check box 168 (only a few of which are referenced in FIG. 10 of the drawings). In the exemplary web page 164, all the check boxes 168 under Standard Equipment have all been checked by way of example based on the VIN that the user entered into the data entry field 152 (see FIG. 8). However, it is to be appreciated that in other circumstances, none of the check boxes 168 or any number of the check boxes 168 may be checked based on the information in the VIN catalogue. The web page 164 also includes an "Optional Equipment" section 170 in which check boxes are provided for optional equipment. For example, a check box may be provided for "After Market Options", "Heated Seats", "CD", "Integrated Phone", "CD Changer", "Power Door Locks", and so on. The check boxes may be checked based on the information included in the VIN catalogue. In one embodiment, the web page 164 includes a data entry field 172 wherein a user may enter the mileage on the vehicle, a drop down menu 174 to enable the user to choose an exterior color, and a drop down menu 176 for choosing an interior color of the vehicle, and so on. Likewise, drop down menus 178 to 190 may be provided for specifying type of wheels, air-conditioning, package, drive train, transmission, spoiler, and power seat respectively.

In one embodiment, the method 100 automatically generates a title for the listing based on the VIN. In particular, the VIN is used to determine a year, make and model, sub-model/style/trims specified, number of doors, and engine capacity (cylinders and output). Thus, as shown by a user interface in the form of a web page 192 (See FIG. 11), a title 194 for the listing may be generated in an automated fashion using information in the VIN catalogue that has been identified by the VIN. For example, in the web page 192, the title "1999 Porsche Boxster S 2-door 6 CYLINDER 2.7 LITER" may be generated in an automated fashion using the VIN 196. Thus, broadly, information or data in a reference database (e.g., the VIN catalogue) may be used (e.g., concatenated) to generate, for example, a title, a description, or the like. In the present example of listing a motor vehicle, based on the VIN catalogue information, an exemplary listing preview 198 (see FIG. 12) may be generated. When the network-based commerce system 10 is an Internet-based system, the listing preview 198 may be in the form of a web page and may include both user entered information as well as information or data that has been populated in an automated fashion using the VIN.

Figure 13A:
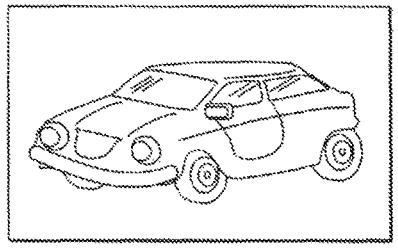
Figure 14:
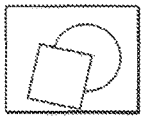

A vehicle description 200 (see FIG. 12) may also be retrieved from the VIN catalogue and populated in the listing preview 198. In one embodiment, the method 140 allows a user to edit the proposed listing prior to posting it on the network-based commerce facility 10. The listing may be edited, for example, using a rich text editor (e.g., a JavaScript text editing tool that allows each description field to have text editing and a dynamic display). An exemplary user interface 204 (see FIG. 13) provides the user with an opportunity to review and submit a listing posted on the network-based commerce system 10.

In certain embodiments of the invention, a user may edit or modify a listing or item after it has been posted on the network-based commerce system 10. For example, in one embodiment of the invention, the system 10 includes a "Revise Your Item" (RYI) function. For example, when the network-based commerce system 10 is a network-based auction system, if there are no bids and more than 12 hours remaining in the auction for the listing, the user or seller may be able to make selected changes. However, when there is either a bid or less than 12 hours remaining, the user or seller may be able to supplement the listings' previous description. If, for example, both a bid and less than 12 hours remain, the seller may in this case make changes not affecting the core description of the listing. Exemplary user interfaces for revising the listing in the form of exemplary web pages are provided in FIGS. 14 to 18.

The web page 210 (see FIG. 14) allows a user to edit pictures or images and listing or item details. The web page 210 allows features such as highlighting, featured category selection, a motors gallery feature, listing icons, page counters, or the like to be added and/or removed. In a similar fashion, a web page 212 is generated to allow the user to add and/or edit a description of the listing or item, and a web page 214 (see FIG. 16) is provided to edit or change check boxes that describe the attributes or features of the listing. In a similar fashion, user interfaces in the form of web pages may be provided that allow the user to revise an item if no bids have been entered or posted for the listing.

Returning to FIG. 7, the method 140 allows a user to add pictures or images at operation or block 220, select shipping and payment methods at operation or block 222, establish warranty details at block 224, and so on.

As mentioned above, the methods 100, 110, 130 and 140 can be applied to any listing in any network-based commerce system. Further, the identification data that the user enters may differ from one listing to another. For example, when a listing is automatically generated for listing in an exemplary movies category, the listing identification data may be a title of the movie or its UPC code. In one embodiment, a help facility to assist a user in finding the UPC code of the movie may be provided. Further, for example when listing a music CD, the user may enter an artist name, title of the CD and so on. Thus, broadly, the invention allows assisted listing wherein an appropriate template is populated with relevant data pertaining to a proposed listing. In one embodiment, the template includes a plurality of check boxes that are checked in an automated fashion based on reference listing data. It is to be appreciated that the listing generated may include extensive information on the listing or any varying degree of information.

Figure 17:
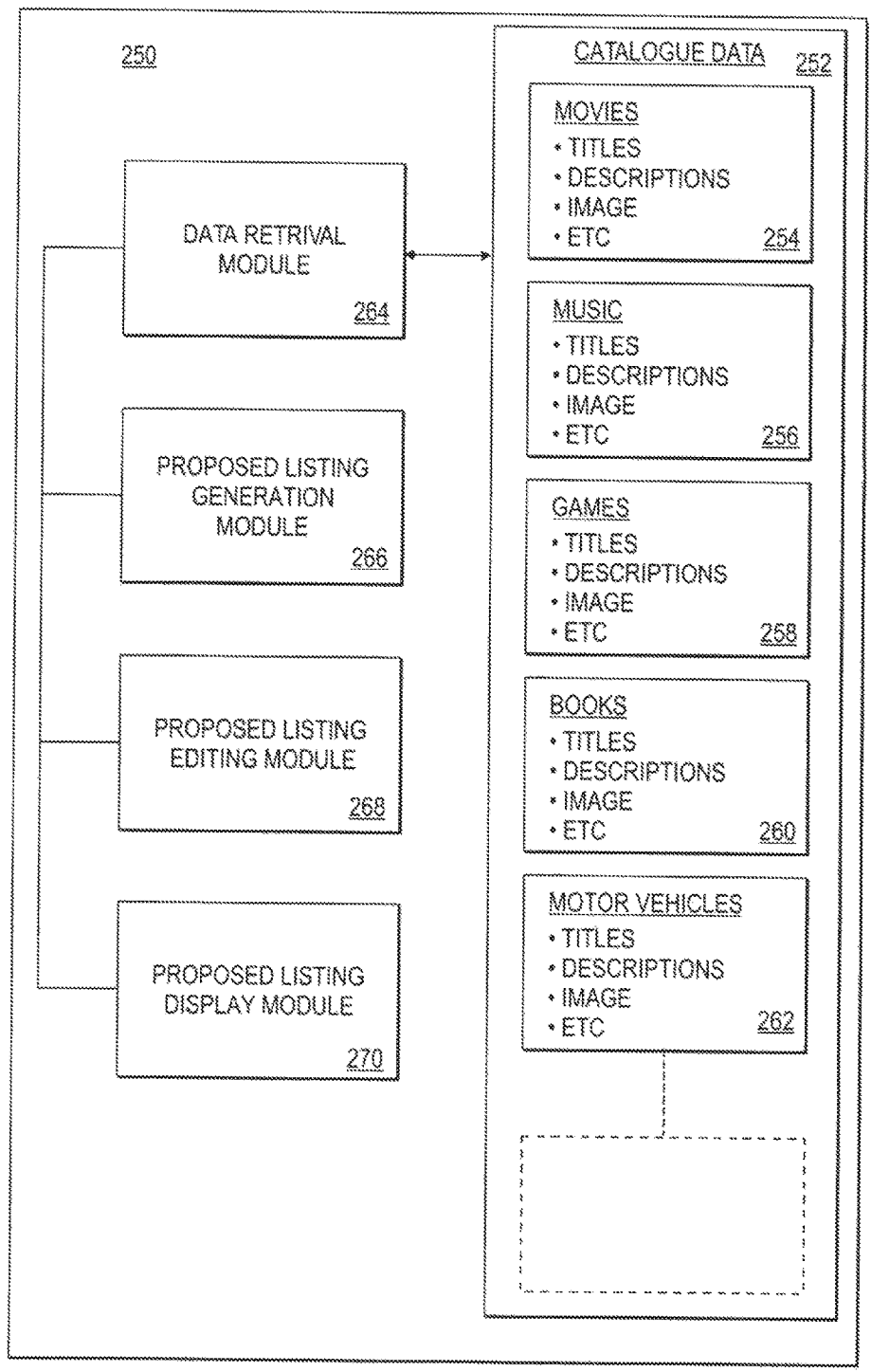
FIG. 17 shows a schematic block diagram of a further system, in accordance with the invention, to generate a listing in a network-based commerce system.

Referring in particular to FIG. 17 of the drawings, reference numeral 250 generally indicates a network-based commerce system in accordance with the invention. The system 250 includes database 252 that includes reference listing data associated with a plurality of listings. In one embodiment, the database 252 is a distributed database, however, in other embodiments it may be a central database. The database 252 is shown to include catalogue data including reference data on movies 254, music 256, games 258, books 260, motor vehicles 262 and so on.

The system 250 includes a data retrieval module 264, a proposed listing generation module 266, a proposed listing editing module 268, and a proposed listing display module 270. The modules 264 to 270 either individually, or in combination execute the functionality of the above described methods 100, 110, 130 and 140.

Figure 18:
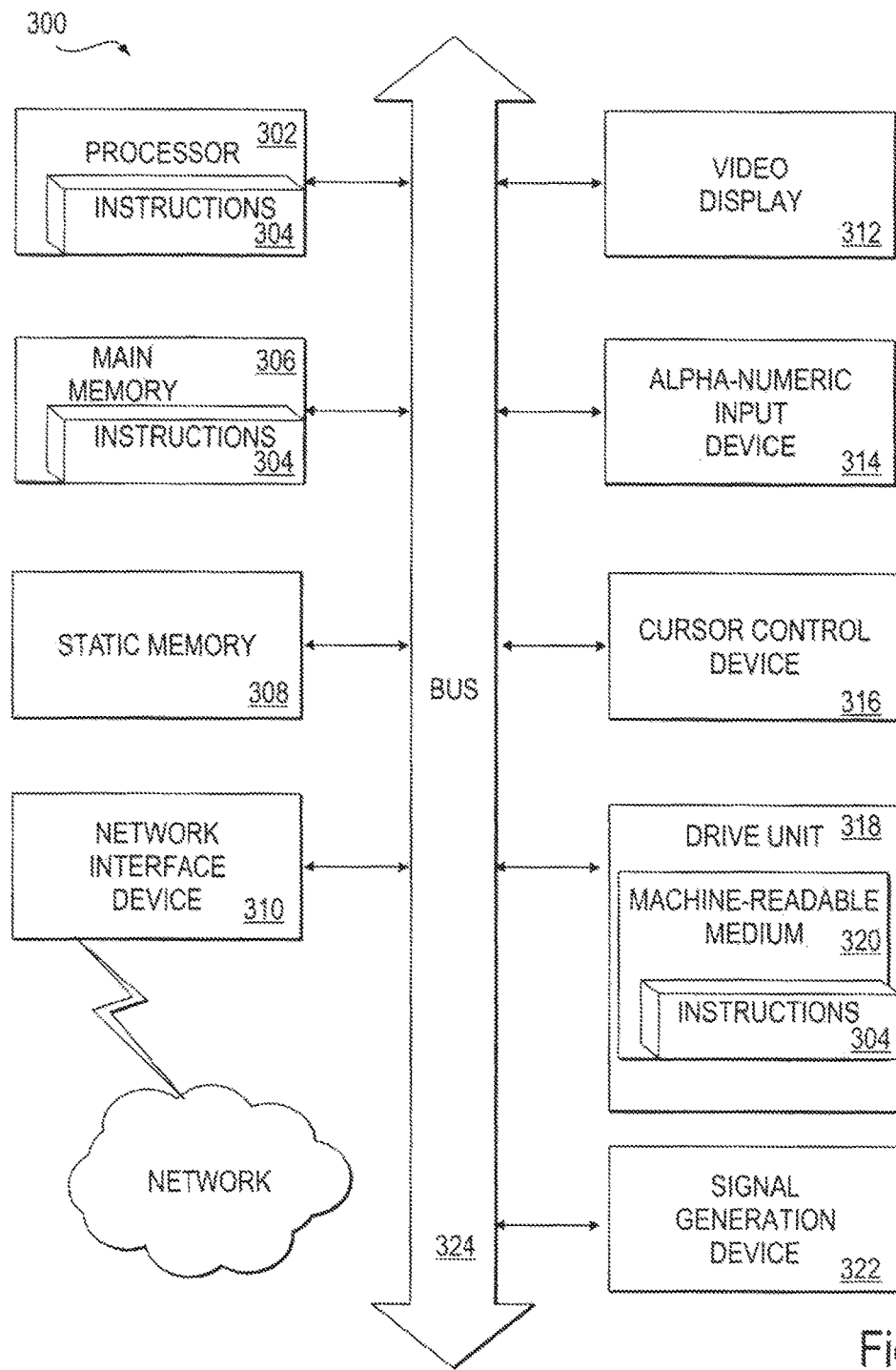
FIG. 18 shows an exemplary computer system for executing a set of instructions to carry out any one or more of the methods described herein.

FIG. 18 shows a diagrammatic representation of a machine in the exemplary form of a computer system 300 within which a set or sequence of instructions, for causing the machine to perform any one of the methodologies discussed herein, may be executed. In alternative embodiments, the machine may comprise a network router, a network switch, a network bridge, Personal Digital Assistant (PDA), a cellular telephone, a web appliance, set-top box (STB) or any machine capable of executing a sequence of instructions that specify actions to be taken by that machine.

The computer system 300 includes a processor 302, a main memory 304 and a static memory 306, which communicate with each other via a bus 308. The computer system 300 may further include a video display unit 310 (e.g., a liquid crystal display (LCD) or a cathode ray tube (CRT)). The computer system 300 also includes an alphanumeric input device 312 (e.g., a keyboard), a cursor control device 314 (e.g., a mouse), a disk drive unit 316, a signal generation device 318 (e.g., a speaker) and a network interface device 320 to interface the computer system to a network 322.

The disk drive unit 316 includes a machine-readable medium 324 on which is stored a set of instructions or software 326 embodying any one, or all, of the methodologies described herein. The software 326 is also shown to reside, completely or at least partially, within the main memory 304 and/or within the processor 302. The software 326 may further be transmitted or received via the network interface device 320. For the purposes of this specification, the term "machine-readable medium" shall be taken to include any medium which is capable of storing or encoding a sequence of instructions for execution by the machine and that cause the machine to perform any one of the methodologies of the present invention. The term "machine-readable medium" shall accordingly be taken to included, but not be limited to, solid-state memories, optical and magnetic disks, and carrier wave signals. Further, while the software is shown in FIG. 15 to reside within a single device, it will be appreciated that the software 326 could be distributed across multiple machines or storage media, which may include the machine-readable medium.

Thus, a method and system to generate a listing in a network-based commerce system 10 have been described. Although the invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A method of generating and presenting a proposed listing describing a product for sale, comprising:
    receiving, by a computer, from a client machine and over a network, a selection from a seller, the selection representing an interaction with a user interface element, the user interface element being associated with a product category for listing the product for sale, the user interface element being located within a first user interface;
    determining, by the computer, the product category allows automated generation of the proposed listing, the product category being associated with one or more predefined templates corresponding to the product category, the one or more predefined templates including a first predefined template for generation of the proposed listing;
    receiving, by the computer from the client machine and over the network, listing identification data identifying a product for which a listing is to be created;

retrieving, by the computer based on the received listing identification data, listing data, the listing data being retrieved from a reference data source, the reference data source being utilized for providing attributes of the identified product, the reference data source including a reference listing database storing at least one previous listing, the at least one previous listing describing a product related to the product being described by the proposed listing and being a source of the attributes;

automatically generating, by the computer, the proposed listing by populating at least a portion of the first predefined template with the listing data, the proposed listing comprising at least one of the attributes;

presenting, by the computer over the network to the client machine, the proposed listing, the proposed listing being included in a second user interface, the second user interface being configured based on the first predefined template to include a first portion of user interface elements being selectable to enable a modifying of the proposed listing, and a second portion of user interface elements being not selectable for modifying the proposed listing.

2. The method of claim 1, further comprising modifying the proposed listing, wherein the modifying comprises deleting one or more of the attributes included in the proposed listing, or adding one or more attributes not previously included in the proposed listing.

3. The method of claim 1, wherein the presenting the proposed listing includes presenting a web page comprising fields being populated according to the proposed listing.

4. The method of claim 3, further comprising receiving, from the client machine, information comprising a user-generated modification and wherein the receiving the user-generated modification includes receiving a user edit to information being presented in a field included in the second user interface.

5. The method of claim 4, wherein presenting the proposed listing further comprises presenting a plurality of check boxes comprising:
one or more pre-selected check boxes corresponding to attribute selections being included in the proposed listing; and
one or more non-selected check boxes corresponding to alternative attribute selections not being included in the proposed listing,
wherein the user-generated modification of the proposed listing includes a selection of one or more of the check boxes.

6. One or more non-transitory computer-readable storage medium having stored therein a set of instructions which, when executed by one or more processors of a computer, causes the computer to execute operations comprising:
receiving, from a client machine and over a network, a selection from a seller, the selection representing an interaction with a user interface element, the user interface element being associated with a product category for listing a product for sale, the user interface element being located within a first user interface;
determining the product category allows automated generation of a proposed listing, the product category being associated with one or more predefined templates corresponding to the product category, the one or more predefined templates including a first predefined template for generation of the proposed listing;
receiving, from the client machine and over the network, listing identification data identifying a product for which a listing is to be created;
retrieving, based on the received listing identification data, listing data, the listing data being retrieved from a reference data source, the reference data source being utilized for providing attributes of the identified product, the reference data source including a reference listing database storing at least one previous listing, the at least one previous listing describing a product related to a product being described by the proposed listing and being a source of the attributes;
automatically generating the proposed listing by populating at least a portion of the first predefined template with the listing data, the proposed listing comprising at least one of the attributes;
presenting, over the network to the client machine, the proposed listing, the proposed listing being included in a second user interface, the second user interface being configured based on the first predefined template to include a first portion of user interface elements being selectable to enable a modifying of the proposed listing, and a second portion of user interface elements being not selectable for modifying the proposed listing.

7. The one or more non-transitory computer-readable storage medium of claim 6, further comprising modifying the proposed listing, wherein the modifying comprises deleting one or more of the attributes included in the proposed listing, or adding one or more attributes not previously included in the proposed listing.

8. The one or more non-transitory computer-readable storage medium of claim 6, wherein the presenting the proposed listing includes presenting a web page comprising fields populated in accordance with the proposed listing.

9. The one or more non-transitory computer-readable storage medium of claim 8, further comprising receiving, from the client machine, information comprising a user-generated modification and wherein the user-generated modification includes receiving a user edit to information presented in a field included in the second user interface.

10. The one or more non-transitory computer-readable storage medium of claim 6, wherein the presenting the proposed listing further comprises providing a plurality of check boxes comprising:
one or more pre-selected check boxes corresponding to attribute selections being included in the proposed listing; and
one or more non-selected check boxes corresponding to alternative attribute selections not being included in the proposed listing,
wherein user-generated modification of the proposed listing includes a selection of one or more of the check boxes.

11. A system for generating and presenting a proposed listing describing a product for sale, the system comprising:
at least one processor and executable instructions accessible on a computer-readable medium that, when executed, cause the at least one processor to perform operations comprising:
receiving, from a client machine and over a network, a selection from a seller, the selection representing an interaction with a user interface element, the user interface element being associated with a product category for listing the product for sale, the user interface element being located within a first user interface;
determining the product category allows automated generation of the proposed listing, the product category being associated with one or more predefined templates corresponding to the product category, the one or more predefined templates including a first predefined template for generation of the proposed listing;

receiving, from the client machine and over the network, listing identification data identifying a product for which a listing is to be created;

retrieving, based on the received listing identification data, listing data, the listing data being retrieved from a reference data source, the reference data source being utilized for providing attributes of the identified product, the reference data source including a reference listing database storing at least one previous listing, the at least one previous listing describing a product related to a product being described by the proposed listing and being a source of the attributes;

automatically generating the proposed listing by populating at least a portion of the first predefined template with the listing data, the proposed listing comprising at least one of the attributes;

presenting, over the network to the client machine, the proposed listing, the proposed listing being included in a second user interface, the second user interface being configured based on the first predefined template to include a first portion of user interface elements being selectable to enable a modifying of the proposed listing, and a second portion of user interface elements being not selectable for modifying the proposed listing.

12. The system of claim 11, wherein the presenting of the proposed listing includes presenting a web page comprising fields being pre-populated according to the proposed listing.

13. The system of claim 12, wherein the presenting of the proposed listing further comprises providing a plurality of check boxes comprising:

one or more pre-selected check boxes that correspond to attribute selections being included in the proposed listing; and one or more non-selected check boxes that correspond to alternative attribute selections not being included in the proposed listing, wherein user-generated modification of the proposed listing includes a selection of one or more of the check boxes.

* * * * *

UNITED STATES PATENT AND TRADEMARK OFFICE
CERTIFICATE OF CORRECTION

PATENT NO. : 10,332,198 B2
APPLICATION NO. : 15/643874
DATED : June 25, 2019
INVENTOR(S) : Steve Grove et al.

Page 1 of 1

It is certified that error appears in the above-identified patent and that said Letters Patent is hereby corrected as shown below:

In Column 11, Line 30, in Claim 3, after "fields" delete "being".

Signed and Sealed this
Third Day of November, 2020

Andrei Iancu
*Director of the United States Patent and Trademark Office*